US010107563B2

(12) United States Patent
Bergan

(10) Patent No.: US 10,107,563 B2
(45) Date of Patent: Oct. 23, 2018

(54) THERMAL ENERGY STORAGE AND PLANT, METHOD AND USE THEREOF

(75) Inventor: Pål Bergan, Nesøya (NO)

(73) Assignee: NEST AS, Billingstad (NO)

( * ) Notice: Subject to any disclaimer, the term of this patent is extended or adjusted under 35 U.S.C. 154(b) by 1184 days.

(21) Appl. No.: 14/124,053

(22) PCT Filed: May 10, 2012

(86) PCT No.: PCT/NO2012/050088
§ 371 (c)(1),
(2), (4) Date: Dec. 5, 2013

(87) PCT Pub. No.: WO2012/169900
PCT Pub. Date: Dec. 13, 2012

(65) Prior Publication Data
US 2014/0110080 A1    Apr. 24, 2014

(30) Foreign Application Priority Data
Jun. 9, 2011 (NO) .................................. 20110839

(51) Int. Cl.
*F28D 20/00* (2006.01)
*F24J 2/34* (2006.01)

(52) U.S. Cl.
CPC .......... *F28D 20/0056* (2013.01); *F24J 2/345* (2013.01); *Y02B 10/20* (2013.01); *Y02E 10/40* (2013.01); *Y02E 60/142* (2013.01); *Y02P 90/50* (2015.11)

(58) Field of Classification Search
CPC ....... F28D 20/0056; F24J 2/345; Y02B 10/20; Y02E 10/40; Y02E 60/142
(Continued)

(56) References Cited

U.S. PATENT DOCUMENTS 2,109,926 A    3/1938 Nelson
2,503,456 A    4/1950 Smith
(Continued)

FOREIGN PATENT DOCUMENTS

CH           59350 A    5/1913
CN      100578133 C    1/2010
(Continued)

OTHER PUBLICATIONS

Clarke, Emma; "CSP Thermal Storage: Increasing the Options"; CSP Today, http://social.csptoday.com/technology/csp-thermal-storage-increasing-options; Mar. 12, 2010; 7 pages.
(Continued)

*Primary Examiner* — Raheena R Malik
(74) *Attorney, Agent, or Firm* — Winstead PC

(57) ABSTRACT

The invention provides a thermal energy storage and heat exchange unit, comprising a solid state thermal storage material, a heat transfer fluid and means for energy input and output, distinctive in that: the storage comprises at least one heat transfer container, solid state thermal storage material is arranged around the heat transfer container, and the heat transfer container contains the heat transfer fluid and the means for energy input and output, so that all heat transferring convection and conduction by the heat transfer fluid takes place within the respective heat transfer container. Method of building the thermal energy storage, plant comprising the storage, method using the plant and use of the storage or plant.

13 Claims, 12 Drawing Sheets

(58) Field of Classification Search
 USPC .......................................... 165/11.1, 10, 45
 See application file for complete search history.

(56) References Cited

U.S. PATENT DOCUMENTS

| | | | |
|---|---|---|---|
| 3,274,769 A | 9/1966 | Reynolds | |
| 3,381,113 A | 4/1968 | Jacques et al. | |
| 3,470,943 A | 10/1969 | Van Huisen | |
| 3,817,038 A * | 6/1974 | Paull | F03G 7/04 165/45 |
| 4,015,585 A | 4/1977 | Fattor | |
| 4,060,988 A * | 12/1977 | Arnold | E21B 43/24 165/45 |
| 4,201,060 A * | 5/1980 | Outmans | F03G 7/04 165/45 |
| 4,219,074 A | 8/1980 | Hansen | |
| 4,323,113 A * | 4/1982 | Troyer | F24D 11/006 165/45 |
| 4,375,831 A | 3/1983 | Downing, Jr. | |
| 4,395,620 A * | 7/1983 | Clyde | F24H 7/0416 338/302 |
| 4,405,010 A * | 9/1983 | Schwartz | F28D 20/0056 165/10 |
| 5,694,515 A * | 12/1997 | Goswami | F24H 7/0433 137/341 |
| 5,816,314 A * | 10/1998 | Wiggs | F24J 3/083 165/134.1 |
| 5,941,237 A | 8/1999 | Shimek et al. | |
| 6,073,448 A | 6/2000 | Lozada | |
| 6,478,077 B1 * | 11/2002 | Story | C01B 3/0005 165/104.12 |
| 6,494,251 B2 * | 12/2002 | Kelley | E21B 36/001 165/45 |
| 6,572,370 B1 * | 6/2003 | Hampden | F27D 17/004 165/901 |
| 6,789,608 B1 | 9/2004 | Wiggs | |
| 7,832,220 B1 | 11/2010 | Wiggs | |
| 2002/0053418 A1 * | 5/2002 | Hirano | F28D 20/0056 165/10 |
| 2009/0165992 A1 | 7/2009 | Song | |
| 2009/0194250 A1 * | 8/2009 | Kudo | F24H 7/04 165/10 |
| 2010/0186398 A1 * | 7/2010 | Huber | H01L 35/30 60/320 |
| 2010/0236749 A1 * | 9/2010 | Stojanowski | F24J 3/083 165/45 |
| 2010/0258266 A1 * | 10/2010 | Stojanowski | F28D 20/0056 165/45 |
| 2010/0307734 A1 * | 12/2010 | Wildig | F24J 3/083 165/287 |
| 2011/0048049 A1 * | 3/2011 | Asai | F24J 3/086 62/260 |
| 2011/0100586 A1 | 5/2011 | Yang | |
| 2011/0226440 A1 * | 9/2011 | Bissell | F28D 20/0039 165/10 |
| 2011/0232858 A1 * | 9/2011 | Hara | F24J 3/084 165/45 |
| 2011/0247354 A1 * | 10/2011 | Asai | F24F 5/0046 62/324.6 |
| 2012/0080163 A1 * | 4/2012 | Hoffman | E21B 7/04 165/45 |
| 2012/0285442 A1 * | 11/2012 | Hung | F24J 2/34 126/620 |

FOREIGN PATENT DOCUMENTS

| | | |
|---|---|---|
| DE | 10211598 A1 | 9/2002 |
| DE | 69624775 T2 | 10/2003 |
| DE | 102009036550 A1 | 5/2010 |
| EA | 2314971 A3 | 3/2014 |
| EP | 0049669 A1 | 4/1982 |
| EP | 1544562 A2 | 6/2005 |
| EP | 2273225 A2 | 1/2011 |
| EP | 2314971 A2 | 4/2011 |
| FR | 335148 A | 1/1904 |
| GB | 2037977 A | 7/1980 |
| JP | S59-164887 A | 9/1984 |
| JP | H05-319482 A | 12/1993 |
| JP | H08-110185 A | 4/1996 |
| JP | 2000-161882 A | 6/2000 |
| JP | 2001-193008 A | 7/2001 |
| JP | 2001-241772 A | 9/2001 |
| JP | 2001-280871 A | 10/2001 |
| JP | 2003-056841 A | 2/2003 |
| JP | 2003-193421 A | 7/2003 |
| JP | 2003-340264 A | 12/2003 |
| JP | 2004-177079 A | 6/2004 |
| JP | 2005048972 A | 2/2005 |
| JP | 2007333295 A | 12/2007 |
| JP | 2009-103442 A | 5/2009 |
| WO | WO-2010070858 A1 | 6/2010 |
| WO | WO-2010085574 A1 | 7/2010 |

OTHER PUBLICATIONS

Amundsen, Kjell, "International Search Report," prepared for PCT/NO2012/050088, as dated Aug. 20, 2012, 5 pages.

* cited by examiner

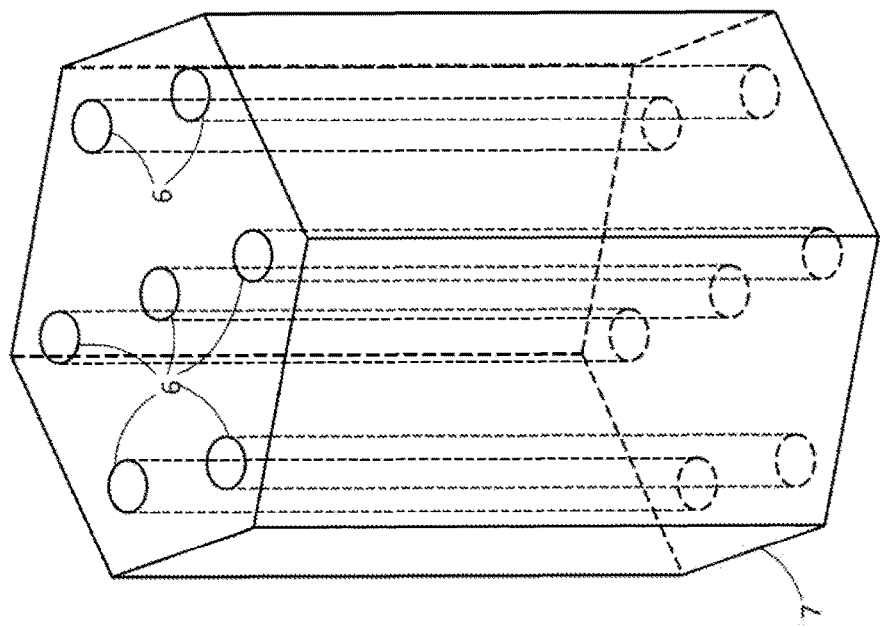
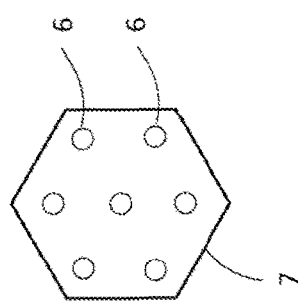
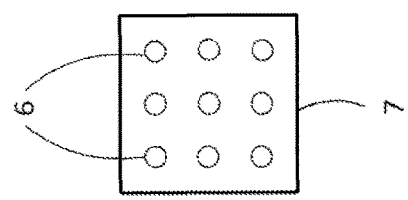
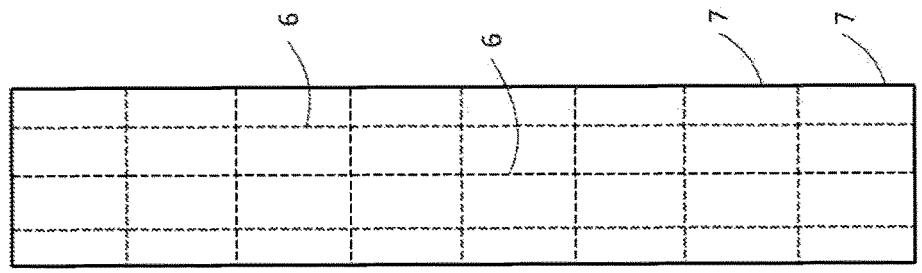
Fig 2

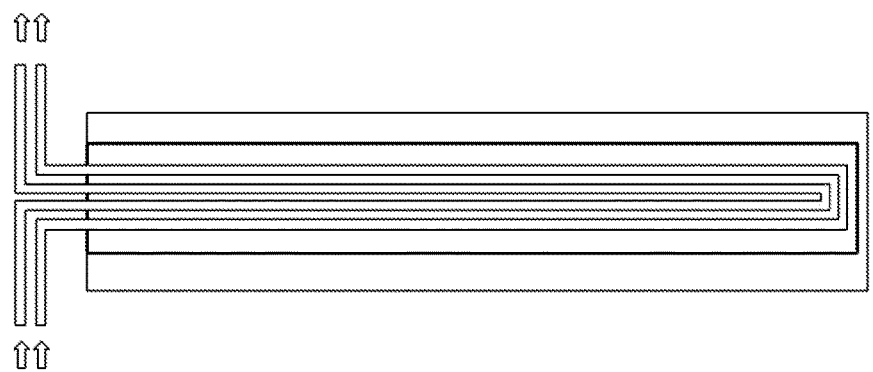
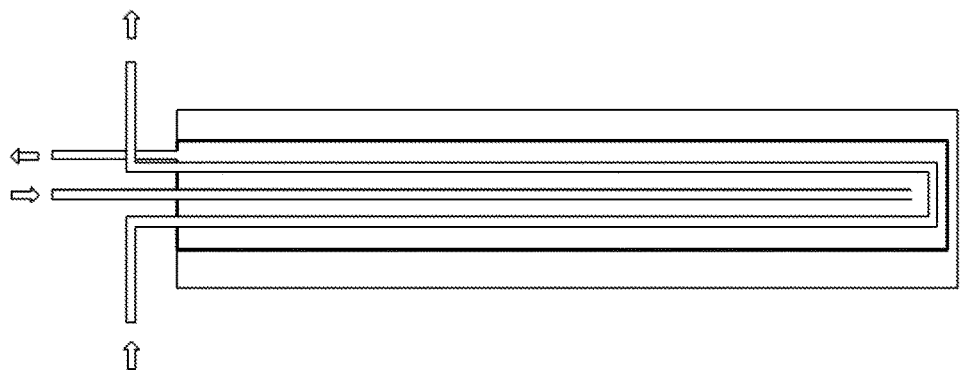

THERMAL ENERGY STORAGE AND PLANT, METHOD AND USE THEREOF

FIELD OF THE INVENTION

The present invention relates to energy storages. More specifically, the invention relates to thermal energy storage and a method of building it, a plant for energy production, a method for energy production and use of the thermal energy storage. The thermal energy storage comprises a solid state main storage.

BACKGROUND OF THE INVENTION AND PRIOR ART

Thermal energy storages can be used to store heat when heat is readily available and to deliver heat in periods of demand.

Several solid state heat storages using concrete or natural rock as storage medium are previously known. However, inefficient or impractical means for charge and discharge of heat is a typical problem of solid state thermal storages.

In patent publication DE 10 2009 036 550 A1 a solid state thermal heat storage is described, having a first part A and a second part B. A pipe system for feeding or taking out heat is arranged through the first part A, for charging or discharging heat by flowing a working medium through the pipe system. The second part B includes a solid state storage medium, which can be concrete, which is loaded or unloaded with thermal energy, i.e. heat. In operation a heat transfer fluid flows in counter flow to the working fluid in the first part A in order to load or unload heat and the heat transfer fluid further flows in separate channels arranged through the second part B in order to unload or load heat, thereby transferring heat between the first part A and the second part B. The second part B contains a number of channels arranged for flow of the heat transfer fluid, the channels are separate from and are arranged a distance away from the first part A. The heat transfer fluid flows by forced or natural convection. The channels add complexity and reduce levels and ranges of stress and displacement that can be handled, thereby limiting the maximum temperature and temperature range, as well as limiting the pressure of the fluid in the channels.

Other prior art solid state heat storages are described in the patent publications DE 10211598, EP 0049669, EP 1544562, EP 2273225, U.S. Pat. No. 3,381,113, U.S. Pat. No. 4,219,074 and CN 100578133. Said patent publications describe thermal storages without a separate heat transfer fluid which can flow by natural convection in order to transfer heat.

The subject matter of the nearest prior art, DE 10 2009 036 550 A1, is described in an article in CSP-today 12 Mar. 2010, where a working temperature up to 400° C. is described. Further, concrete is described as cost effective for thermal heat storage, but all the other elements, including tubes add cost, resulting in a cost for large plants only slightly cheaper than competing technologies. Achieving a more cost efficient heat storage is set forth as a main challenge; another is to charge and discharge heat more rapidly.

The objective of the present invention is to provide a thermal energy storage which is beneficial over the above mentioned technology with respect to the issues mentioned. Further, the thermal heat storage should preferably be:

Feasible for operation at higher temperature and higher fluid pressure, thereby allowing production of electricity in a turbine-generator more efficiently Be less complex and more compact Allow adaptation of materials used according to requirement Facilitating easy maintenance and replacement of parts Easier to scale up or down to any size of storage Have increased versatility, feasible for direct connection to heat producing energy plants such as coal power plants, nuclear power plants, waste burning plants and some solar power plants (concentrated solar power) as well as electric grids and electricity producing power plants such as solar power plants, wind power plants and hydro power plants Be safe against explosions and the environment Feasible for operation at −70 to +700° C.

Be possible to use virtually anywhere and in any topography

Faster response for charging and discharging energy

Allowing saving peak production that otherwise would overload the grid or be wasted and allowing delivery when the connected source has insufficient production or the energy price is high, over the day, week or season, balancing power supply to power demand.

Allowing a downscaled grid and more optimal operating parameters of the grid, including reducing the grid investments for peak production and transmission infrastructure between regions and nations Increasing power security and quality

SUMMARY OF THE INVENTION

The present invention is beneficial with respect to all of the above-mentioned issues.

The invention provides a thermal energy storage, comprising a solid state thermal storage material, a heat transfer fluid and means for energy input and output, distinctive in that:

the storage comprises at least one heat transfer container, solid state thermal storage material is arranged around the heat transfer container, and the heat transfer container contains the heat transfer fluid and the means for energy input and output, so that all heat transferring convection and conduction by the heat transfer fluid takes place within the respective heat transfer container.

The solid state material can be any solid material or combinations of solid materials having sufficient heat storage capacity and strength at the intended operating conditions, such as natural rock, metals and alloys, substrates, concrete, grouting and others. The heat transfer fluid can be any liquid or gas, however, preferably it is stable and low-viscous at the operating conditions, non-toxic and having high heat capacity and large density variation with varying temperature and thereby good heat transfer rate capability by convection, such as thermal oil or molten salts. Thermal oils, particularly synthetic oils but also mineral oils, are commercially available as such and as oil for transformers or motors. Currently thermal oils are available for temperatures up to about 400° C. for operation at atmospheric pressure, however, increasing the pressure above the heat transfer fluid increases the maximum operating temperature. Even better performing oils are under development and will be preferred when available. Molten salts, natural or synthetic, or molten metals or alloys are currently feasible and available for temperatures in the range up to 400-700°

C. or above if higher temperature sources are available. The molten salts can be based on Na, K, Ca nitrates, -nitrites or diphenyl/biphenyl oxides, for example. The heat transfer container can take any shape and orientation, but preferably it has the shape and orientation of a smooth or corrugated standing cylinder, pipe or tube into which a section of a pipe circuit for energy input and output can be arranged, as well as electric heating means for energy input, whilst allowing natural convection over a long distance along the means for energy input and output and heat transfer container walls in order to maximize the heat transfer rate. A heat transfer container in this context means a single void, volume, cavity or space without separate parts, branches or channels outside the inner surface or central volume thereof, such as the interior of a cylinder, pipe or tube, or a cavity or a volume directly in a concrete block, rock or other solid material, open or closed but able to contain the heat transfer fluid. This is contrary to the teaching of DE 10 2009 036 550 A1. Even though the heat transfer container is the interior volume of a cylinder, pipe, tube, void or any feasible volume in the storage without branches, the heat transfer container will in this context, for the sake of clarity, also be described with reference only to the words cylinder, pipe or tube or sections thereof. Heat transfer takes place in or more precisely through the respective heat transfer containers, which means that heat is transferred between the means for energy input and output and the surrounding solid state thermal storage material via the heat transfer containers filled with heat transfer fluid. All heat transfer between the means for energy input and output and the solid state thermal storage material is in principle through the single volume heat transfer containers, by or through the heat transfer fluid and preferably in substance by the very effective heat transfer mechanism convection. The means for energy input and output operatively arranged into the heat transfer container filled with heat transfer fluid, function as an effective but simple heat exchanger. All parts of the storage has an own thermal storage capacity contributing to the heat storage. Heat transfer efficiency is enhanced for preferred embodiments by substantial heat transfer by convection, which is a rapid and efficient heat transfer mechanism that is additional to slower conduction and radiation. With the solution of the present invention, effective charging and discharging of energy and a simple, versatile, easily scalable design is achieved at the same time. With the thermal energy storage of the invention, all heat transfer between the means for energy input and output and the surrounding solid state thermal storage material takes place in the respective heat transfer containers. Or in other words, charging and discharging of heat, of the solid state storage material, is by heat transfer in the heat transfer fluid filled heat transfer container between the means for energy input and output and the surrounding solid state thermal storage material.

The simplest embodiment of the thermal energy storage of the invention is possibly a natural rock or concrete block having a single cavity as the heat transfer container arranged directly in the solid material, into which cavity heat transfer fluid has been filled and a pipe circuit segment has been arranged as the means for energy input and output. Thermal energy is thus stored in the natural rock or concrete block, the heat transfer fluid filled cavity enhances the rate of loading and unloading thermal energy to or from the pipe circuit segment by increasing the heat transfer rate by providing substantial heat transfer by convection in the heat transfer fluid, which heat transfer by convection comes in addition to heat conduction and radiation.

Another simple embodiment of the thermal storage of the invention is a number of heat transfer containers arranged side by side at appropriate distance in a single concrete block that can be moulded in one operation, the concrete block can be small or large. This embodiment can be beneficial due to simple production. For example can preassembled heat transfer container tubes be arranged side by side inside the outer limits of the storage, the volume between the tubes inside the outer storage limits can be built by filling cement or fluid grouting, for example by pumping.

The simple design of the storage, without any requirement of any additional channels or pipes inside the solid state heat storage parts outside the heat transfer containers, facilitates production, assembly, scaling up or down and versatility, as well as maintenance, replacement of damaged pipes, and ability to withstand high temperature and temperature gradients without deterioration.

The storage comprises numerous preferable embodiments and features, some of which are described below.

The means for energy input and output preferably comprises pipes arranged for flow of fluid warmer than the storage temperature for heat energy input or fluid colder than the storage temperature for heat energy output. The pipes for heat energy input can be the same pipes as used for energy output, or different pipe circuit loops or segments can be provided for energy input and output, conveniently if different fluids are used as heat carrier for energy input and output. Any feasible electric heating means, such as Joule heating, heating cables and heat tracing can be arranged as a means for energy input, alone or in combination with pipes transporting fluid. Even the fluid within the heat transfer container may be directly used as means for heat delivery or heat extraction. As an example, heat may be delivered to the storage by circulating the heat exchanger fluid such as oil whereas heat may be extracted by a separate water/steam pressure pipe loop inside the heat exchanger.

Preferably the means for energy input and output comprises a pipe brought into the heat transfer container from top to bottom and back to top, preferably the downward and upward flow pipe sections are arranged a distance apart, in order to charge or discharge heat along the full length as immersed into heat transfer fluid. The pipe may have corrugations or other structure increasing the surface area arranged longitudinally along parts thereof and a separation wall between a part of the upward and downward flow pipe sections, in order to enhance the heat transfer rate. Alternatively pipes are brought in at the top and out at the bottom of the heat transfer container, or opposite, or in and out at the bottom of the cavities. Bringing the pipe in and out at either end of the heat transfer container is an alternative arrangement. Alternatively the means for energy input and output comprises an outer pipe brought into the heat transfer container from top to bottom, where it is closed, and an inner pipe back from near the lower end of the outer pipe, where it is open, to top, arranged concentrically in a cylindrical heat transfer container as a concentric pipe in pipe arrangement. A concentric design can be preferable with respect to even radial distance for convection and possibility to have a fully concentric embodiment with one single concentric heat transfer container, which can be preferable for the highest temperatures due to perfect circular symmetrical temperature profiles without anomalies.

The means for energy input and output preferably comprises pipes carrying supercritical water, steam, water, synthetic or natural thermal oils, synthetic or natural molten salts, flue gas or exhaust gas. Preferably the pipes or pipe circuit parts for energy input or output are conveniently provided with means for correct positioning in the heat transfer containers, such as spacer structures, for example spacer clamps arranged at elevation intervals. A particular advantage of the present invention is that the system can be directly connected for using the typical heated fluid provided by power plants, such as heated water, steam and supercritical water. Modern coal power plants may provide supercritical water at 375-700° C., which is preferable where available. Nuclear power plants provide steam or water at 150-300° C., which is preferable when readily available. Waste burning plants and green energy plants provide steam or water at different temperatures and pressures depending on the technology used. Solar power plants may provide heated oils or molten salts which can be heat exchanged with water-steam to produce electricity. Feasible pipes of small diameter for high temperature and high pressure, and fittings and valves, are readily available, for example based on ferritic steel. The very highest temperatures and pressures may require use of the so called superalloys. Direct connection of supercritical water or hot high pressure steam is effective since no further energy transformation is required for charging or discharging of the thermal energy, and the higher temperature and pressure ranges for thermal heat input, as available from modern coal and nuclear power plants, can be used to operate electrical generators by driving efficient turbines. Electrical heating elements or devices, Joule heating means, such as heating rods or cables, are preferably included for embodiments with oil, molten salt or metals in input and output pipes or in the heat transfer cavities, for maintaining said materials in a fluid state in case of a long term shutdown, and in addition or alternatively storage vessels where such fluids can solidify safely can be operatively connected for storing such salt or melts.

Preferably the heat transfer container is a vertically standing cylinder, pipe or tube with top extending up at a top side of the storage and with a flange, lid, cap or similar at the top end through which the means for energy input and output in the form of small diameter high pressure pipes are arranged, the heat transfer container is filled with thermal oil or other heat transfer fluid up to at least a level equal to the surrounding solid material, the uppermost part is fully filled or vapour filled and preferably has sensors and means for leakage detection and handling arranged in order to detect and handle any leakage from the means for heat input and output. Also the lower container or pipe end may comprise a flange, lid or similar. Preferably feedthroughs or bushings are arranged in said flanges for feeding through high pressure pipes and optional heat tracing as the means for energy input and output, and also sensor means, the container is filled with thermal oil and is preferably held at a pressure less than 20 bar, more preferable less than 8 bar, even more preferably atmospheric pressure, the sensor means monitors pressure or other parameters indicating leakage from the high pressure pipes.

The solid state thermal storage material preferably comprises grouting and concrete, the concrete forms a basic storage unit and comprises one or more vertically oriented cavities or channels each containing a heat transfer container in the form of a cylinder, tube or pipe, or a section thereof, around which grouting is arranged, the grouting filling the volume between the container surface and concrete. The chosen number of channels and heat transfer containers arranged within one unit depends on the desired performance of charging and extracting heat as well as the specific dimensions and physical design of each heat exchange container. The grouting has two main functions: to provide a continuous link between the heat exchanger and the main solid state material, and, second, to facilitate use of an enhanced performance material in the most critical thermal zone. Grouting is typically high quality, high strength mortar or concrete paste providing increased strength even at high temperature and large temperature variations whilst ensuring direct contact without any gaps between the pipe and concrete, providing both improved mechanical strength and high thermal conductivity. The storage preferably comprises high strength fibre reinforced grouting between the heat transfer containers and high strength, high density fibre or bar reinforced concrete, the concrete preferably comprises a prefabricated reinforcement structure. The fibres are for example steel, carbon or basalt fibres. The reinforcement bars may similarly be made of steel or bundled carbon or basalt fibres. Preferably the storage contains no aggregates unfavourable for high temperature service, such as $SiO_2$. However, basalt, serpentine, magnetite and olivine are examples of rock aggregates that can be acceptable for very high temperature operation due to high heat conduction and heat capacity.

Preferably a number of concrete units are arranged on top of each other, the cavities or channels are aligned and extend from the top surface of the uppermost unit to at least a lower part of the lowermost unit, upper pipe or tube ends with lids, i.e. heat transfer containers, extend up over the concrete, the number of concrete units form a stack of concrete units, several stacks are arranged side by side inside thermal insulation walls, floor and roof, the upper pipe or tube ends are however easily accessible from the top by lifting up insulation, optionally insulation is arranged between stacks or groups of stacks in order to provide different temperature zones within the storage. However, gaps of suitable dimension to avoid contact are conveniently arranged between stacks of concrete units, allowing for thermal expansion and contraction and providing some insulation and escape routes of humidity. Internal insulation can be useful for various reasons and preferable when a part of the storage is operated at a different operating temperature, such as a high operating temperature feasible for operation of a particular turbine-electric generator. The storage will typically be located in a building or outer structure and be connected to several sources and several users, each delivering or using heat at different temperatures which can have corresponding parts of the storage allocated. In another preferable embodiment, the storage is arranged partly or fully into the ground.

Preferably the distance between the means for energy input and output and the inner wall of a heat transfer fluid filled vertically oriented heat transfer container is adapted to be a compromise between maximum heat transfer rate by convection and conduction and associated cost. At too short distance heat transfer is mainly by conduction and possibly some radiation, at appropriate distance convection becomes dominant and enhances the heat transfer rate. Larger heat exchanger means a larger surface area to transfer heat to the surrounding solid. But large heat transfer cavities means more expensive thermal oil or other expensive fluid must be filled into the annular space between the thermal energy carrying pipes and the heat transfer container inner wall. Numerical simulation or testing will reveal appropriate dimensions for relevant heat transfer fluids, heat transfer container dimensions and operating temperatures in accordance with targeted operating characteristics for the storage. As a starting point, the radial heat transfer fluid filled annular space width of the heat transfer container should be 2-10 times the diameter of the pipes for energy input and output.

The storage is preferably adapted to operate at a temperature in the range −70 to +700° C., such as 0-650 or 60-600°

C., at a dynamic temperature range that can vary broadly and be very wide. The dynamic temperature range ΔT can be 50, 100, 200 or even 400° C. No previously known comparable heat storage can, as far as we know, operate at such wide temperature ranges without undue cracking, leakage and other operating problems. The operating temperature and dynamic temperature range can vary broadly according to the connected sources and users, within the estimated widest realistic current temperature range of −70 to +700° C. In principle it is limitations with respect to materials, thermal oils or molten salts that limit the operating temperature and ranges. In practice design parameters are chosen according to operating parameters defined by type of sources and turbines connected, governing temperatures of fluid flowing in to and out from the storage, and resulting dynamic temperature range, requiring appropriate choices with respect to materials and shape. Appropriate concrete, grouting, pipe and cylinder materials are commercially available. Preferably the storage comprises or is connected to pipes and valves arranged as headers or manifolds for flowing fluid through pipes for energy input and output, in series or parallel, controllable by valves. For energy storages with several heat transfer containers the flow through input and output piping can be in parallel in order to achieve heating and cooling to be as optimal as possible. Preferably the storage comprises or is connected to means for conditioning of heat transfer fluid, such as a vapour condenser and a pump in a conditioning loop. Control of vapour pressure is crucial for safety. Similar arrangements may be required also for the energy carrying fluid in the pipes for energy input and output, depending on choice of fluid and operating parameters. Safety valves and pipes directing any leakage of hot fluid to a safe location are preferably arranged to the lids or flanges at top, optionally also at bottom, of the heat transfer containers. Preferably all valves and pumps are arranged outside the lids or flanges at the top of the heat transfer containers, whilst pipe connections are arranged in lids or flanges, as threaded feedthroughs for example, and sensor means are arranged in the heat transfer container but connected to the lid or flange. This is a huge advantage since accessibility is improved, resulting in easier operation and maintenance.

The invention also provides a method of building a thermal energy storage according to the invention, by arranging a number of vertically oriented heat transfer containers in the storage, and filling grout or cement in the volume outside said containers up to a level close to the upper ends of said containers. This provides a huge advantage over prior art thermal storages, which will be clear from the further explanation. For the typical embodiments of the method, heat transfer containers are arranged in channels through stacked concrete blocks and grouting is filled up in the annular volumes between containers and blocks. This ensures an intimate contact favourable for heat conduction and allows using an adapted high quality grouting in the annular volumes where the thermally induced stresses are highest.

However, a simple embodiment of the method is to arrange a number of heat transfer containers side by side at appropriate distance in a single concrete block that can be moulded in one operation, the concrete block can be small or large. Standardization of this embodiment can be beneficial due to simple production. For example can preassembled heat transfer container tubes be arranged side by side inside the outer limits or formwork of the storage, the single concrete block can be built by filling cement or fluid grouting, for example by pumping, in the volume between the tubes inside the outer storage limits. The heat transfer containers can be used for temperature control, such as cooling a large concrete block, during the building process. Channels or partition gaps for thermal expansion and contraction, and escape of water which is not chemically bound, can preferably be arranged in a large storage. Appropriate spacers can be used as found convenient. In a preferred embodiment the heat transfer container tubes are delivered on site with pipe circuit segments for energy input and output preinstalled, preferably with connections readily available under protection covers in the upper container ends, and possibly the containers are prefilled with heat transfer fluid.

In a preferable embodiment of the method, concrete unit blocks with vertical channels distributed between a top and a bottom face are fabricated first, a heat transfer container having smaller diameter than the channels are arranged into respective channels, grout is filled into the volumes between the containers and concrete channel surfaces, and means for energy input and output and sensor means are brought into the containers and said means are arranged releasable and connected to a lid in the respective heat transfer containers. Heat transfer fluid is also brought into said containers, and spacers for positioning of pipe circuit segment for energy input and output, and control valves and other means for operation and control are provided and operatively arranged. The concrete unit blocks are preferably prefabricated and of a size and weight suitable for handling by a normal building site crane.

The invention also provides a plant for energy production, comprising a source for energy and means for delivery, consumption or production of energy, the source and the means are operatively arranged. The plant is distinctive in that a thermal energy storage is operatively arranged between said source and said means, the storage comprises a solid state thermal storage material, a heat transfer fluid and means for energy input and output, the storage further comprises at least one heat transfer container, solid state thermal storage material is arranged around the heat transfer container, and the heat transfer container contains the heat transfer fluid and the means for energy input and output, so that all heat transferring convection and conductions by the heat transfer fluid takes place within the respective heat transfer containers. The plant of the invention comprises the thermal energy storage of the invention operatively arranged to a number of sources and a number of users.

The source of energy to the plant is a thermal source or an electric source, or both in any combination. For example, in a preferable embodiment a number of sources are connected, namely thermal sources, at different delivery temperatures, and electrical sources, the heat storage is adapted to store heat at different temperatures in different zones thereof, the zones may be separated by insulation or air gaps, and several means for delivery, consumption or production is connected, including turbine-electric generator combinations for each fluid used for energy input and output, such as supercritical water and steam, respectively, and piping for district heating or providing steam to industry.

The plant or storage can in a special mode of usage be utilized primarily as a heat exchanger between different fluids rather than for energy storage. For instance, thermally heated oil, such as delivered from a concentrated solar power plant, may be circulated within the heat exchanger containers where it is mainly heat exchanged directly with water/steam circulated in the internal pipe system.

The invention also provides a method for energy production with a plant according to the invention, distinctive by storing energy in periods of peak production, low market price or surplus production and delivering energy in periods of low production or high market price. In a preferable embodiment of the method, whereby a number of sources are connected to the plant, the sources have out of phase cycles for production and cost, whereby a source is chosen for storage when said source is in a mode of peak production, surplus production or low energy price.

Further, the invention provides use of a storage according to the invention, in any embodiment thereof, or a plant according to the invention, in any embodiment thereof, for storage of energy from sources for energy in periods of peak or surplus production or low market price, for delivering said energy in periods of insufficient production or high market price. The use according to the invention results in one or more of the benefits: it reduces the demand for electric energy grid transfer capacity, the energy supply security increases and the maximum electrical consumption can be increased without overloading the grid.

The invention may also serve an important purpose of providing energy supply security by storage of several types of renewable energy sources such as wind, waves, ocean currents, and solar, which may have rather unpredictable performance of energy delivery. Such energy storage capabilities by the invention may become particularly important in the future as a growing share of the energy supply may be expected to come from renewable sources. It is also worth noting that the invention is well suited in connection with a geothermal heat source which by way of heat storage during the night can increase the power production during the day.

The thermal energy storage of the invention is clearly also beneficial used as a cold storage. In warm climates and developed countries a very significant part of the energy consumption is for cooling, the storage of the invention can store energy at low temperature (energy sink) for delivery as cold fluid for cooling or air conditioning purposes, at reduced cost.

FIGURES

The invention is illustrated with 8 figures, of which:

FIG. 2 illustrates another embodiment of a storage according to the invention,

Figure 3:
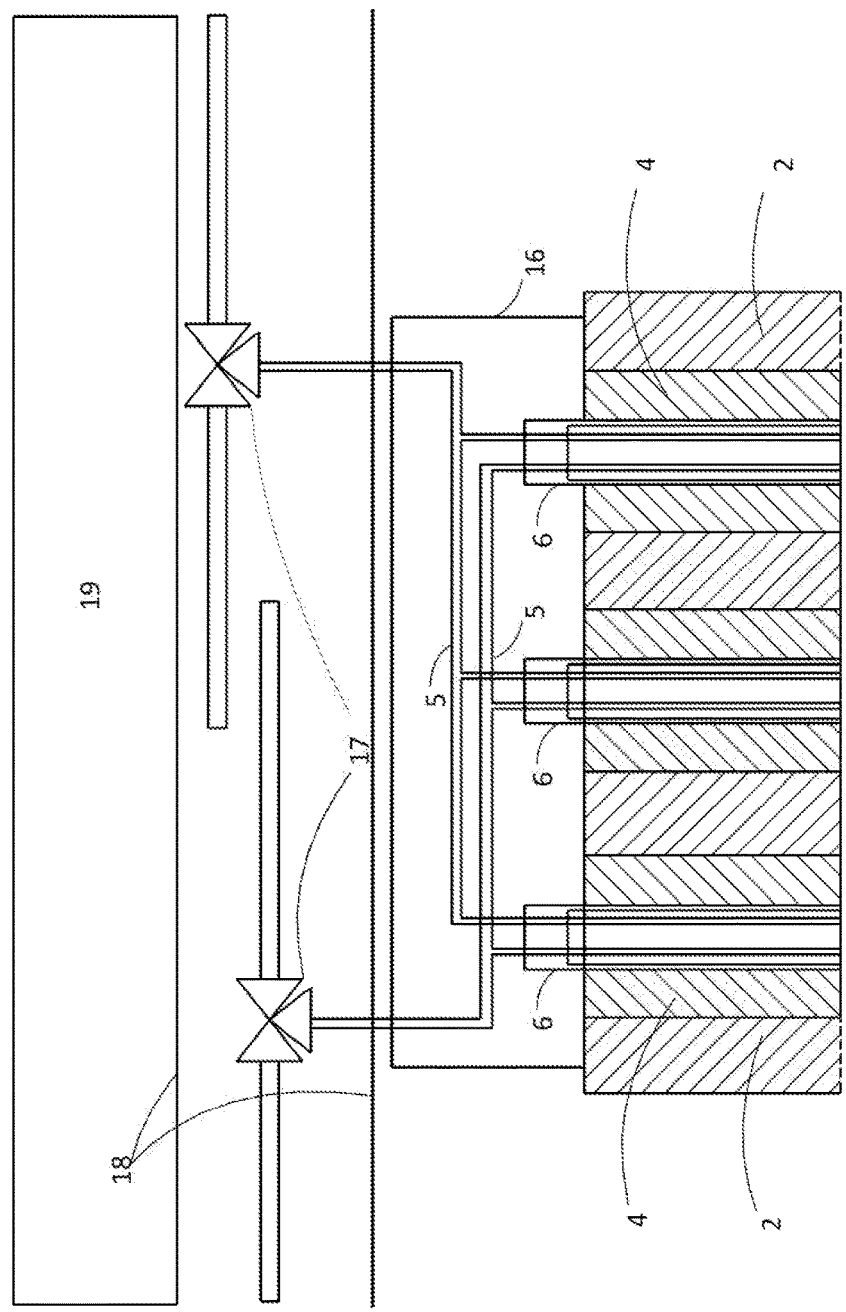
Figure 4:
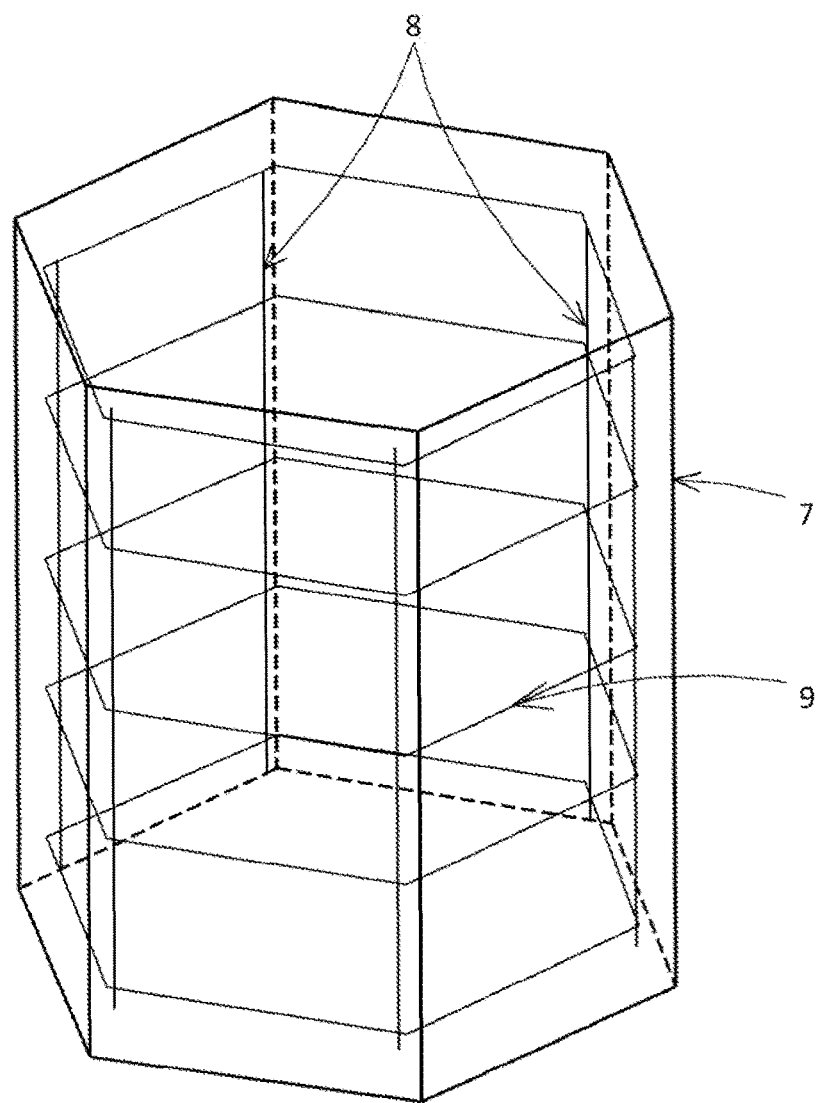
Figure 5:
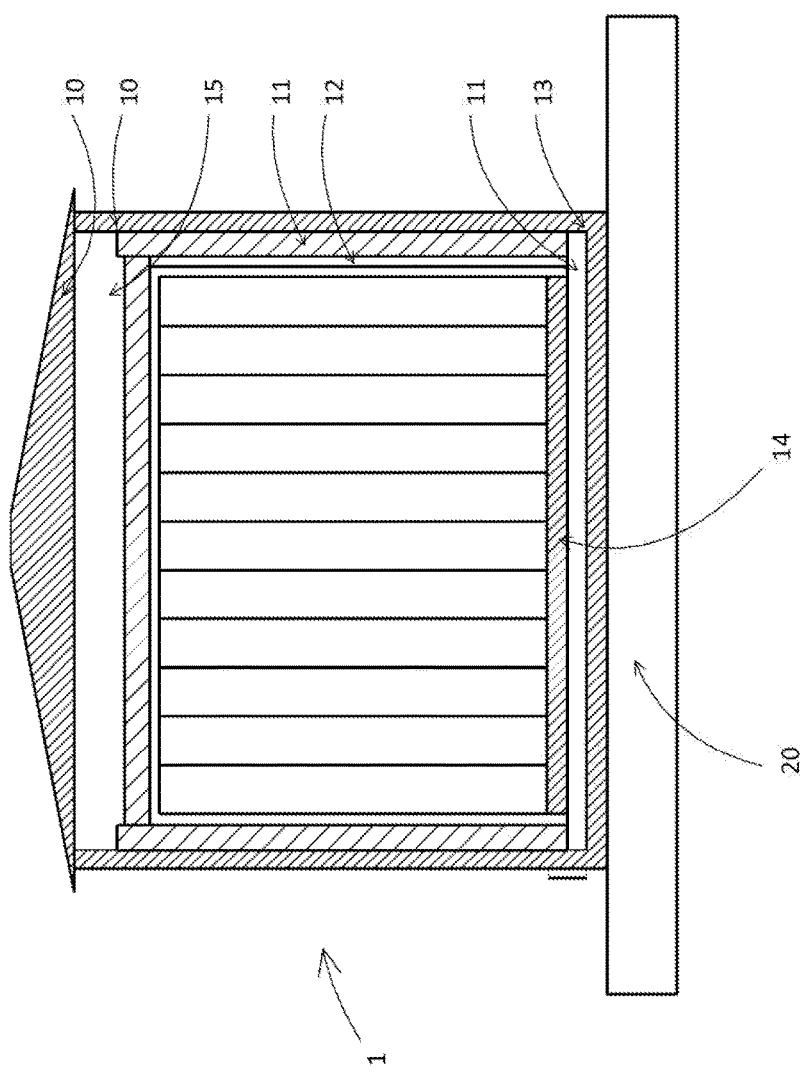
Figure 6:
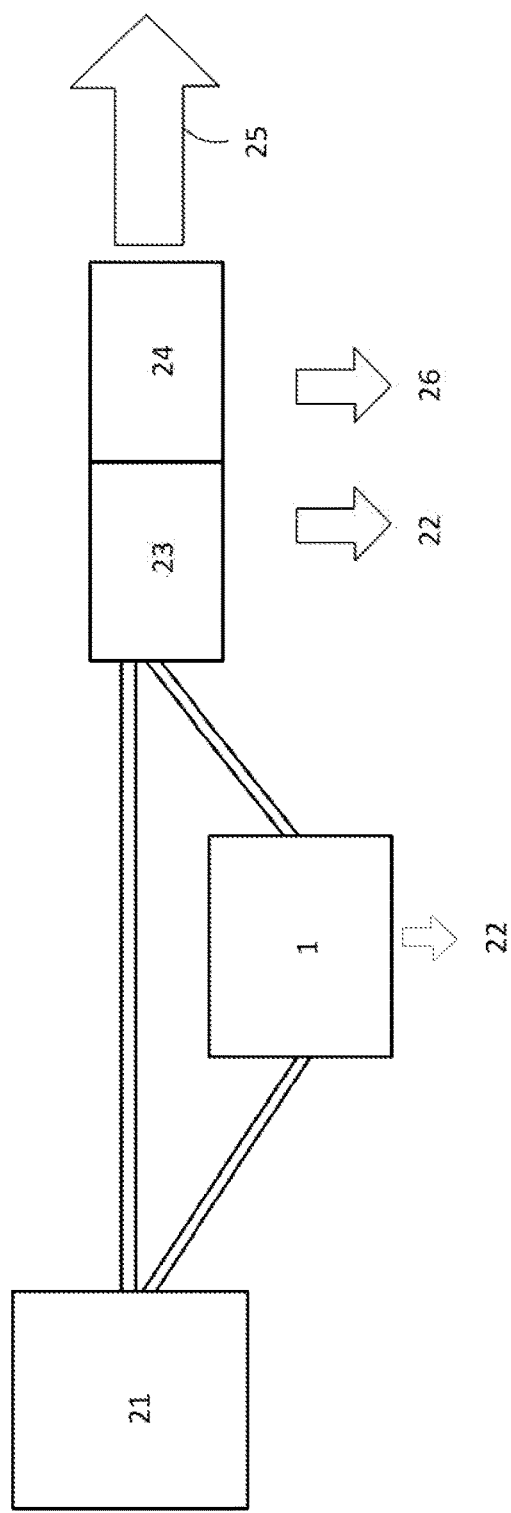
Figure 7:
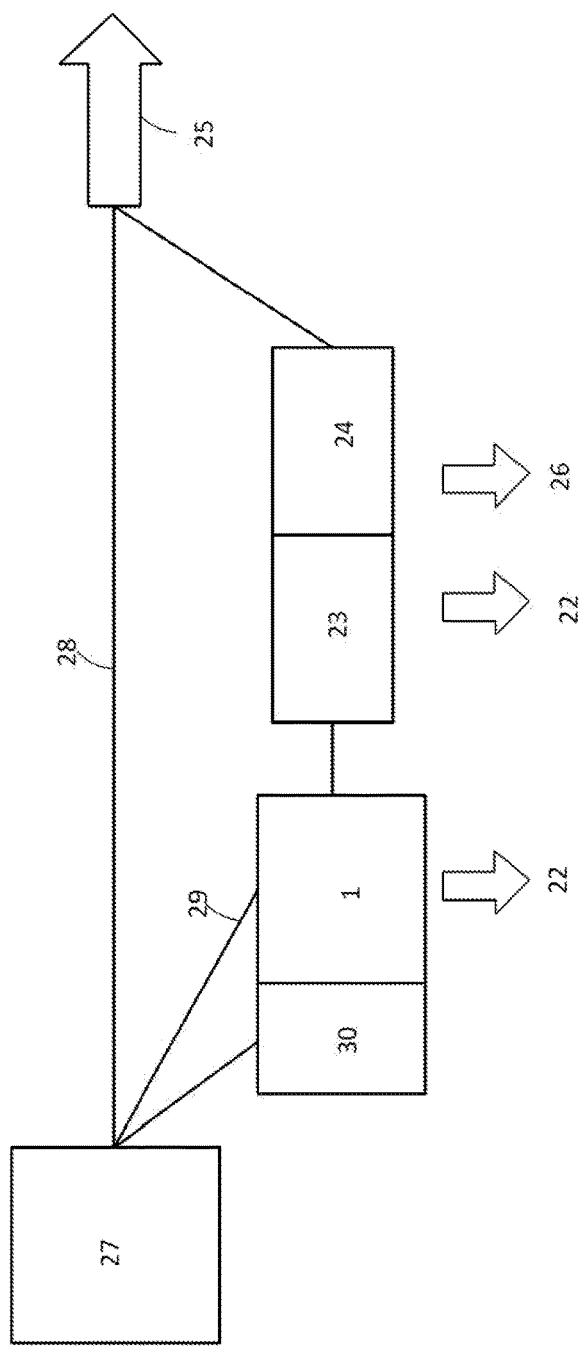
Figure 8:
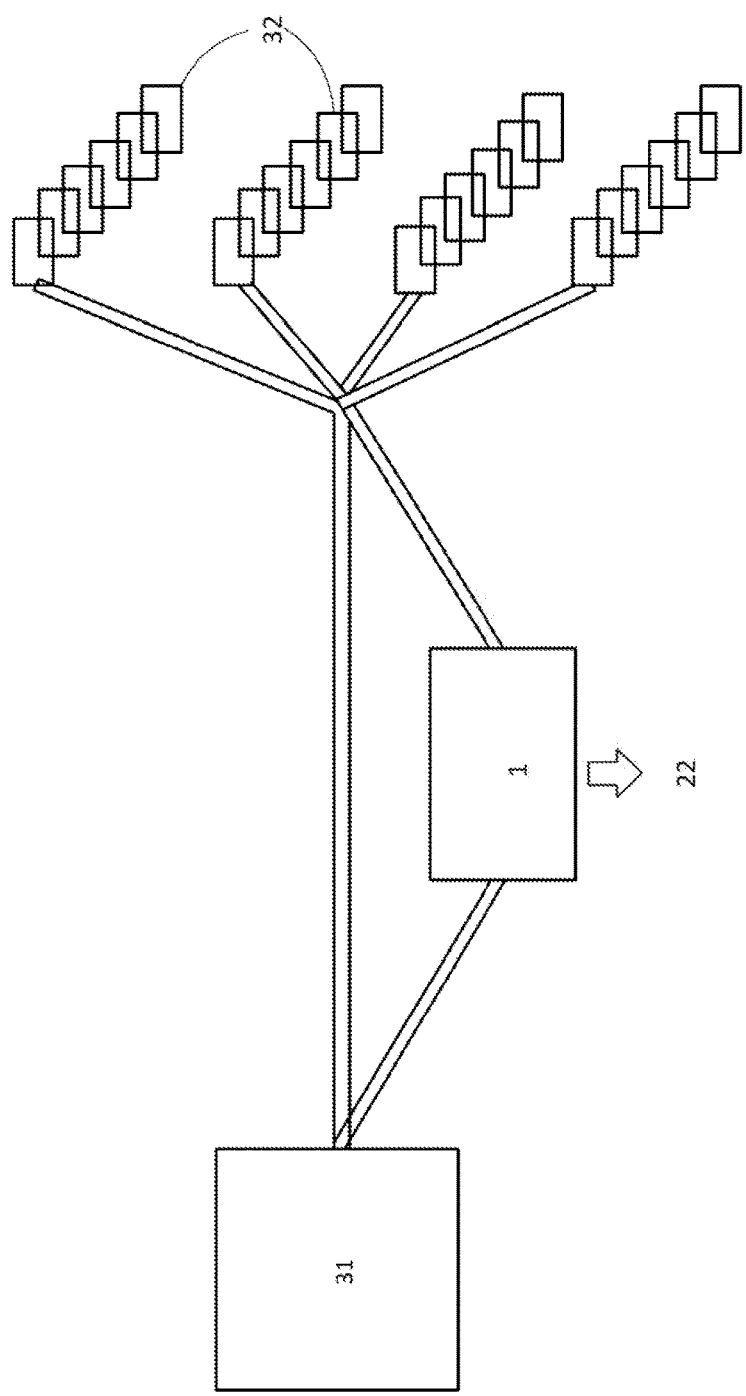
Figure 13:
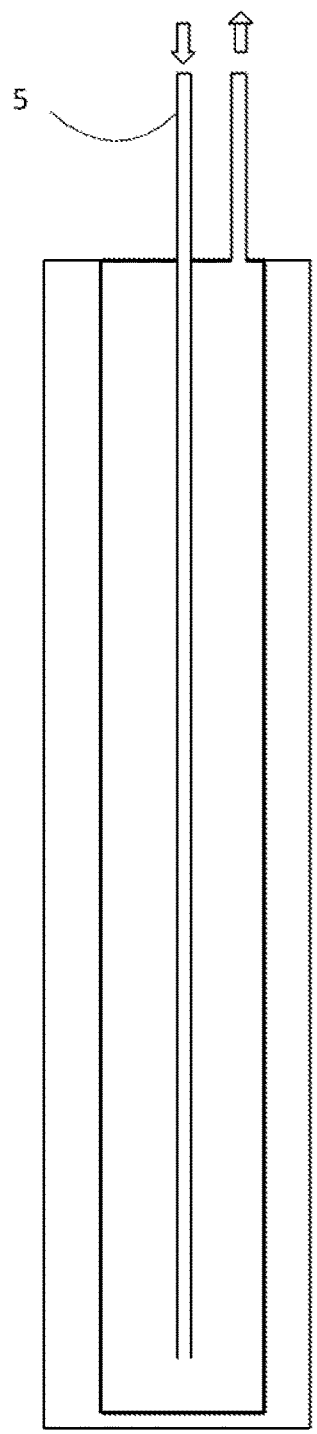
Figure 14:
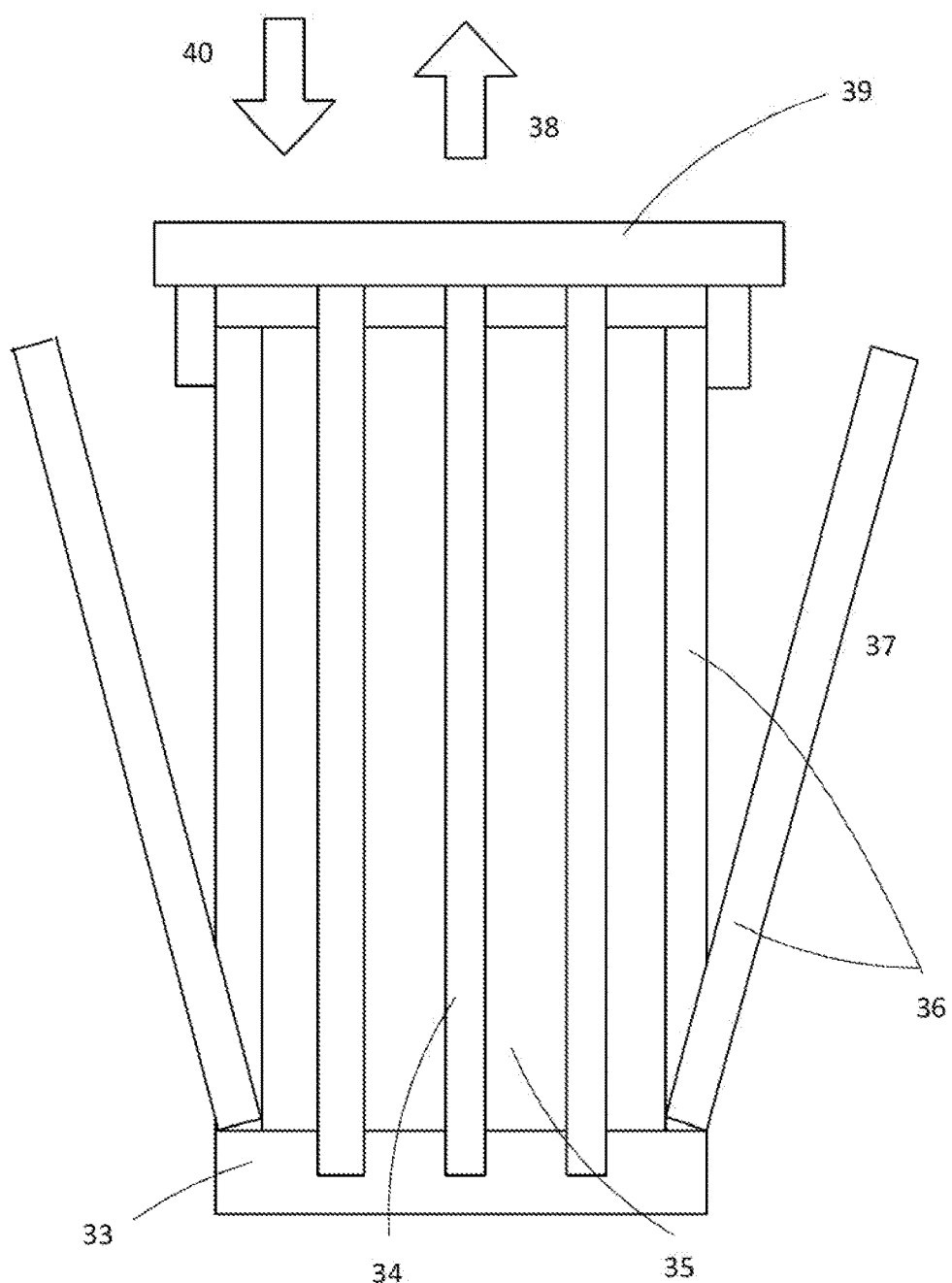

FIG. 3 illustrates how pipes for energy input and output can be arranged for a storage according to the invention, FIG. 4 illustrates how reinforcement can be arranged in a concrete block in a storage according to the invention, FIG. 5 illustrates an embodiment of a storage of the invention, FIG. 6 illustrates a plant of the invention, FIG. 7 illustrates another embodiment of a plant of the invention, FIG. 8 illustrates a further embodiment of a plant of the invention, FIGS. 9-13 illustrate some of the different arrangements of the means for energy input and output in the heat transfer container, and FIG. 14 illustrates one of the methods for moulding a concrete unit block for a heat storage of the invention.

DETAILED DESCRIPTION

Figure 1:
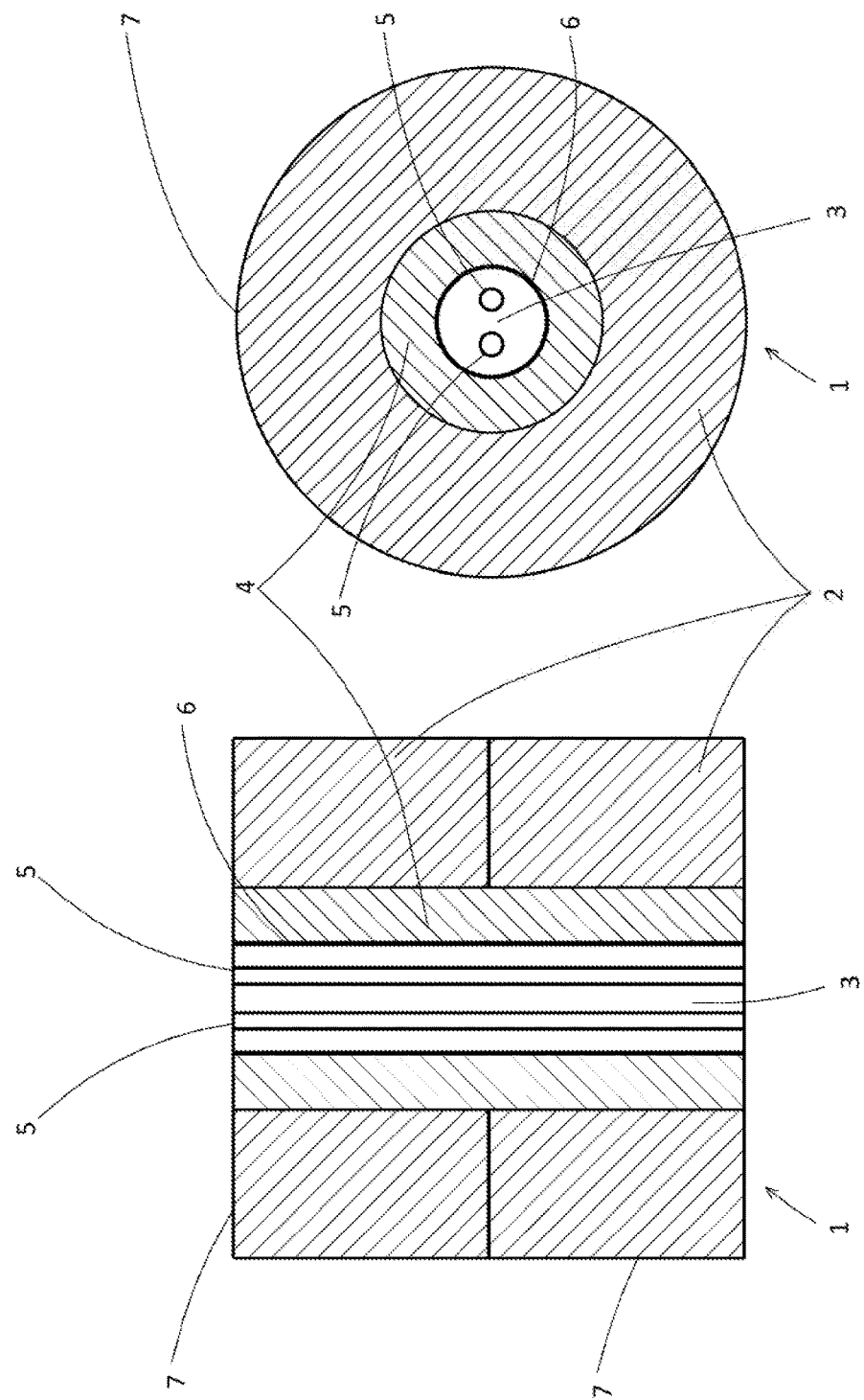
FIG. 1 illustrates an embodiment of a storage according to the invention.

Reference is made to FIG. 1, illustrating a simple but effective embodiment of a storage of the invention. A thermal energy storage and heat exchange unit 1 is illustrated in longitudinal section and cross section. The storage comprises a solid state thermal storage material 2, 4, more specifically concrete 2 and grouting 4 in the illustrated embodiment, a heat transfer fluid 3 and means for energy input and output 5, that is pressure pipes in the illustrated embodiment. The number of pressure pipes may vary according to the application. The storage further comprises at least one heat transfer container 6, as a section of a cylinder or pipe in the illustrated embodiment. The solid state thermal storage material, grouting 4 and concrete 2, is arranged around the heat transfer container 6. The heat transfer container 6 contains heat transfer fluid 3 and the means for energy input and output 5, so that all heat transferring convection and conduction by the heat transfer fluid takes place within the heat transfer container, contrary to prior art solutions. The input part and the output part of the pipe 5, with downward and upward flow respectively, can preferably be arranged with a distance apart for optimal convection conditions. In operation the pipe will contain a fluid warmer or colder than the surrounding heat transfer fluid, depending on the mode of operation, which is charging or discharging of heat. During loading or charging of heat, the pipes 5 are warmer than the heat transfer fluid which is warmer than the heat transfer container wall which is warmer than the grouting, accordingly the convection is so that heat transfer fluid mainly flows upward along the warmer pipes 5 and downward along the wall of the colder heat transfer container 6. During unloading or discharging of heat, the pipes 5 are colder than the heat transfer fluid which is colder than the heat transfer container wall which is colder than the grouting; accordingly the convection is so that the heat transfer fluid mainly flows downward along the colder pipes 5 and upward along the wall of the heat transfer container 6. All subject matter or parts of the storage contributes to the heat storage capacity of the storage. In the illustrated embodiment, two cylindrical concrete blocks 7 are illustrated, with pipes and heat transfer container extending through the blocks, the blocks are a part of a stack of blocks.

For clarity, only some of identical items, in some of the Figures, have reference numericals provided, and some parts may be out of scale or orientation or even omitted in order to illustrate other parts more clearly. Identical or similar items have the same reference numerical in different figures.

In FIG. 2 two different embodiments are illustrated, firstly hexagonal concrete blocks 7 as the basic storage unit, with seven channels for heat transfer containers 6 arranged vertically through the blocks. Secondly, a square cross-section concrete block 7 is illustrated as the basic storage unit, with nine channels for heat transfer containers. The figure also shows eight square cross-section concrete blocks stacked on top of each other in longitudinal section. The stacked blocks are out of scale, the separation between blocks are indicated by dotted lines and each channel is briefly indicated by a dotted line, but this illustrates some of the simplicity and versatility of the invention. The stacked blocks will for preferable embodiments stand vertically, providing long distance for heat conduction and convection, thus enhanced capability for heat transfer.

FIG. 3 illustrates one arrangement of pipes 5 for energy input and output in order to load and unload heat. Several other arrangements can be used, with valves 17 allowing serial or parallel flow between stacks or units. A pipe system will for many embodiments also be arranged to the heat transfer containers 6, and also sensor means, for handling vapour and pressure and leakage control, however, for the sake of clarity such pipes and means are not illustrated. A column safety cover 16 is arranged on top of the stacks but below valves 17, access decks 18 and other control devices which is below an insulation layer 19.

FIG. 4 illustrates how a reinforcement structure with vertical reinforcement 8 and loop reinforcement 9 can be arranged in a concrete block 7. Reinforcement can also be arranged external to the concrete block, and parts of reinforcement can extend out of the concrete block, for example as a structure comprising lifting lugs. Reinforcement can be arranged as grids or as a metal membrane on the concrete block side and bottom surface, with or without openings for water vapour escape.

FIG. 5 illustrates a thermal storage 1 of the invention in cross section, as arranged into a building structure 10 with insulation 11, membrane 12, bottom sole 13, bottom slab 14 and operations or access room 15. The storage 1 is arranged standing on the soil 20. Components such as pipes, flanges, valves and sensor means are readily available from the operations or access room 15 for maintenance, repair and operation. The roof and top insulation can be lifted away with a normal crane, likewise individual concrete blocks and heat transfer containers. Due to the simple design, the storage is easy to scale up or down and easy to maintain or repair. The top of the storage can be flush with ground or soil level by building the storage into the ground.

As an example, a storage according to the invention may comprise many equal stacks with 8 reinforced concrete units arranged on top of each other where each unit has dimension 180 cm by 180 cm in the horizontal plane and 200 cm in height. Within each unit there is an array of 3 by 3 vertical, cylindrical cavities or channels of diameter 30 cm and positioned 60 cm apart, center to center, providing continuous channels for the total storage height of 16 meters. Within each channel or cavity, and for its total height there is inserted a cylindrical heat transfer container of diameter 20 cm which is filled with heat transfer fluid, and means for energy input and output is arranged in the container, more specifically a high pressure small diameter pipe loop segment. The 5 cm gap between the heat transfer container and the cavity walls of the concrete is filled with fibre reinforced high strength concrete grout. The inflow thermal fluid pipes are connected at the top through a single input pipe and a manifold ensuring equal heat inflow to all heat transfer containers in the stack. Likewise, all output pipes are connected together through a manifold at the top of the stack allowing for a single outflow pipe. However, manifolds, pipes and control valves can be arranged in many ways.

FIGS. 6, 7 and 8 illustrate embodiments of a plant according to the invention, each embodiment including at least one thermal energy storage 1 of the invention. In a very simplified way, FIG. 6 illustrates a plant with a thermal source 21 such as a modern coal plant or nuclear power plant, using a source hot fluid medium directly as heat carrying fluid for energy input, the hot fluid is transported through pipes to the storage 1 or the turbine 23, as indicated with lines. Heat loss is illustrated with arrows 22, recycled or used heat with arrow 26, the turbine-generator with reference numericals 23 and 24, respectively, and electric power to the market is illustrated with reference numerical 25. FIG. 7 illustrates a plant with an electric power unit source or a grid source 27 and FIG. 8 illustrates a plant with a thermal power unit source or a waste burning unit 31. The output is electric power 25 for the embodiments illustrated on FIGS. 6 and 7, and heat to industry or consumers 32 for the embodiment illustrated on FIG. 8. An alternative feature with a boiler 30 connected as an alternative input source to electric source, is illustrated in FIG. 7, however, this alternative is less effective than the illustrated direct electric heating 29 within the heat transfer containers. In FIG. 7, the source is directly connected by the grid 28 to the market 25 and indirectly via electric heating 29 and the boiler 30 for energy storage when the source production is higher than the market demand or the price is low.

Figure 10:
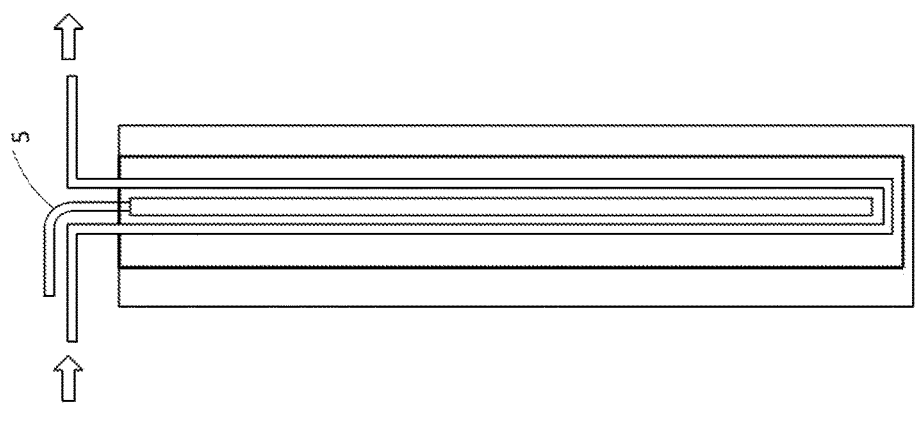
Figure 9:
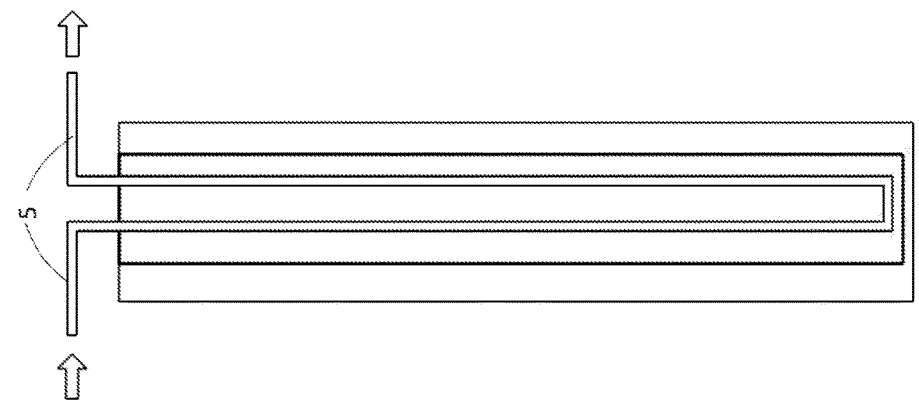

FIGS. 9-13 illustrate some of the different arrangements of the means 5 for energy input and output in the heat transfer container and thereby exemplify the extreme versatility of the invention. The means 5 for energy input and output in the heat transfer container comprises pipes, pipe loop or pipe circuit segments, electric heater elements and in a few embodiments a fluid such as the heat transfer fluid. In FIG. 9 the same type of fluid is used for heat input as for heat output whereas the heat transfer fluid in the heat transfer container is typically of another type. An example of this would be that water/steam is used for input as well as output whereas the heat transfer fluid is oil. In FIG. 10 the heat input is provided by way of a Joule type electric heating element 5 arranged directly into the heat transfer fluid whilst the heat output is provided by way of a pipe fluid. Example of this would be that the storage is connected with an electric grid or a wind farm and where the output would be steam that is used for regenerating electricity via turbines and generators when needed. The heat transfer fluid may be oil or molten salt, or other suitable fluid. In FIG. 11 the heat input fluid is the same as for the heat transfer fluid whereas the heat output comes by way of another fluid. An example of this is that the heat input is oil from a concentrated solar plant (CSP) and the same oil is used as the heat transfer fluid. The heat output, on the other hand, is provided by steam or another fluid. In FIG. 12 the fluids in the heat input system, the heat output system and the heat transfer fluid are all different. For instance, the input may be via molten salt from a CSP plant, the output may be steam, and the heat transfer fluid may be oil or molten salt. In FIG. 13 all fluids are the same. This would be typical of a cold storage where all fluids could be the same coolant. It could also be a case where the heat input as well as heat output is by way of oil, and any further conversion, for instance from oil to steam, takes place outside the storage. Note that the input pipe 5 extends in substance over the full height of the heat transfer container, preferably at the heat transfer container center, as this provides a line of maximum or minimum temperature along the heat transfer container center line during operation, which provides high heat transfer rate. An possibly less favorable alternative is merely to have the means for heat transfer input or output as connections to the heat transfer container, for example input at bottom at center of the container and one or several outputs at top toward the side walls, which is intended to be included in the term means for heat input or output in the context of the present invention.

It is particularly worth noting that the "storage" in most cases serves not only as heat storage, but also as a heat exchanger; in fact, this is a system with a "built-in" heat exchanger. More specifically, the storage provides exchange of heat between different media and exchange of heat over time. Notably it may also be utilized primarily in a heat exchanger mode as for daytime operation of concentrated solar power plants.

FIG. 14 illustrates one of the methods for moulding a concrete unit block for a heat storage of the invention. More specifically, a bottom plate 33, channel rods 34, concrete 35, hinged walls 36 and a perforated top plate 39 are illustrated. Concrete is poured in from above, 40, the concrete is compacted by vibrating the form or by inserted vibrators, the top plate 39 with channel rods 34 are pulled up after sufficient hardening of the concrete has taken place, the walls are folded out 37 and the bottom plate 33 is also removed when the curing is sufficient. Said method represents an embodiment of the invention. Other ways of concrete block fabrication are also feasible such as using an outer, enclosing metal sheet as form work as well as permanent outer reinforcement.

The heat loss of a large thermal storage of the invention is surprisingly low. For an insulated storage of 100 000 m³ of 10 000 MWh storage capacity, the heat loss per day will typically be less than 1‰ (per thousand) of the stored heat energy.

Current power plants, particularly older versions, are rigid with respect to adapting power production to demand. Over the day, the variation in energy price can have a factor above 2. The major cost for a coal power plant, nuclear power plant and in general any power plant is the investment. The additional investment for using a thermal storage of the invention in a power plant is estimated in case studies to be surprisingly beneficial, with respect to profit and for delivery assurance. This is possible because less or no production will be wasted or sold at lowest price, whilst more production will be sold at higher price and additionally the energy supply security increases. Simultaneously, power delivery security increases, which also have a significant value.

The heat storage of the invention may comprise any feature as described or illustrated in this document, any such operative combination is an embodiment of the invention. The plant of the invention may comprise any feature as described or illustrated in this document, any such operative combination is an embodiment of the invention. The methods of the invention may comprise any feature or step as described or illustrated in this document, any such operative combination is an embodiment of the invention.

The invention claimed is:

1. A thermal energy storage comprising:
   a number of thermal energy storage units arranged together, the thermal energy storage units comprising:
   a concrete solid state thermal energy storage material;
   at least one heat transfer container;
   a heat transfer fluid; and
   a pipe heat exchanger;
   wherein the concrete solid state thermal energy storage material is arranged around the at least one heat transfer container;
   wherein the at least one heat transfer container contains the heat transfer fluid and the pipe heat exchanger immersed into the heat transfer fluid;
   wherein the heat transfer container is vertically oriented and the pipe heat exchanger has inlet and outlet in one and the same end of the heat transfer container;
   thermal insulation arranged below, around and on top of the thermal energy storage units;
   wherein the solid state thermal storage material comprises grouting or cement and concrete, the concrete forms a basic storage unit and comprises one or more vertically oriented cavities or channels each containing a heat transfer container in a form of a cylinder, tube or pipe, or a section thereof, around which grouting or cement is arranged, the grouting or cement filling a volume between the container and concrete; and
   wherein a number of concrete units are arranged on top of each other, the cavities or channels are aligned and extend from a top surface of the uppermost unit to at least a lower part of the lowermost unit, upper heat transfer container ends with flanges or lid extend up over the concrete, the number of concrete units form a stacked concrete unit, several stacked units are arranged side by side inside a thermal insulation wall, floor and roof, the flanges or lids being accessible from the top by lifting up insulation.

2. The thermal energy storage according to claim 1, comprising an electric heating device for energy input by connecting to a source of electricity.

3. The thermal energy storage according to claim 1, wherein:
   the heat transfer container is a vertically standing cylinder, tube or pipe with top extending up at a top side of the thermal energy storage and with a flange at a top end; and
   the heat transfer container is filled with thermal oil up to at least a level equal to a surrounding solid material.

4. The thermal energy storage according to claim 1, wherein each heat transfer container is an elongated standing cylindrical container, tube or pipe having a flange at an upper end and also at the lower end, feedthroughs, connectors, penetrators or bushings are arranged through at least one of said flanges for feeding through high pressure pipes, the container or pipe is filled with thermal oil, molten salt or other suitable fluid and is held at a pressure of 1-8 bar.

5. The thermal energy storage according to claim 1, wherein the insulation comprises insulation or air gaps arranged between stacks or groups of stacks in order to provide different temperature parts of the storage.

6. The thermal energy storage according to claim 1, wherein the pipe heat exchanger is for energy input and output and comprises a pipe brought into the heat transfer container from top to bottom and back to top.

7. The thermal energy storage according to claim 1, wherein pipes of the pipe heat exchanger are carrying supercritical water, water, steam, flue gas, thermal oil, or molten salt.

8. The thermal energy storage according to claim 1, wherein a distance between pipes of the pipe heat exchanger for energy input and output and an inner wall of the heat transfer fluid filled vertically oriented heat transfer container is adapted to be an optimum between maximum heat transfer rate by convection and conduction and associated cost.

9. The thermal energy storage according to claim 1, wherein the thermal energy storage comprises high strength fibre reinforced grouting outside heat transfer cavities but inside high strength, high density fibre reinforced concrete, the concrete comprises a prefabricated reinforcement structure.

10. The thermal energy storage according to claim 1, wherein the thermal energy storage is adapted to operate at a temperature in the range −70 to +700° C. at a dynamic temperature range that exceeds 200° C.

11. The thermal energy storage according to claim 1, wherein pipes and valves are arranged as headers and manifolds for flowing fluid through pipes for energy input and output, in series or parallel controllable by valves.

12. The thermal energy storage according to claim 1, wherein the storage comprises or is connected to a vapour condenser and a pump for conditioning of heat transfer fluid.

13. The thermal energy storage according to claim 10, wherein the thermal energy storage is adapted to operate at a temperature in the range 40-700° C.

* * * * *